Dec. 2, 1969          L. G. STEPP          3,481,645
            AUTOMATIC TRUCK BODY COVER
Filed Aug. 4, 1967                    4 Sheets-Sheet 1

INVENTOR
LOWELL G. STEPP
BY
*Robert E. Breidenthal*
ATTORNEY

Dec. 2, 1969     L. G. STEPP     3,481,645
AUTOMATIC TRUCK BODY COVER
Filed Aug. 4, 1967     4 Sheets-Sheet 2
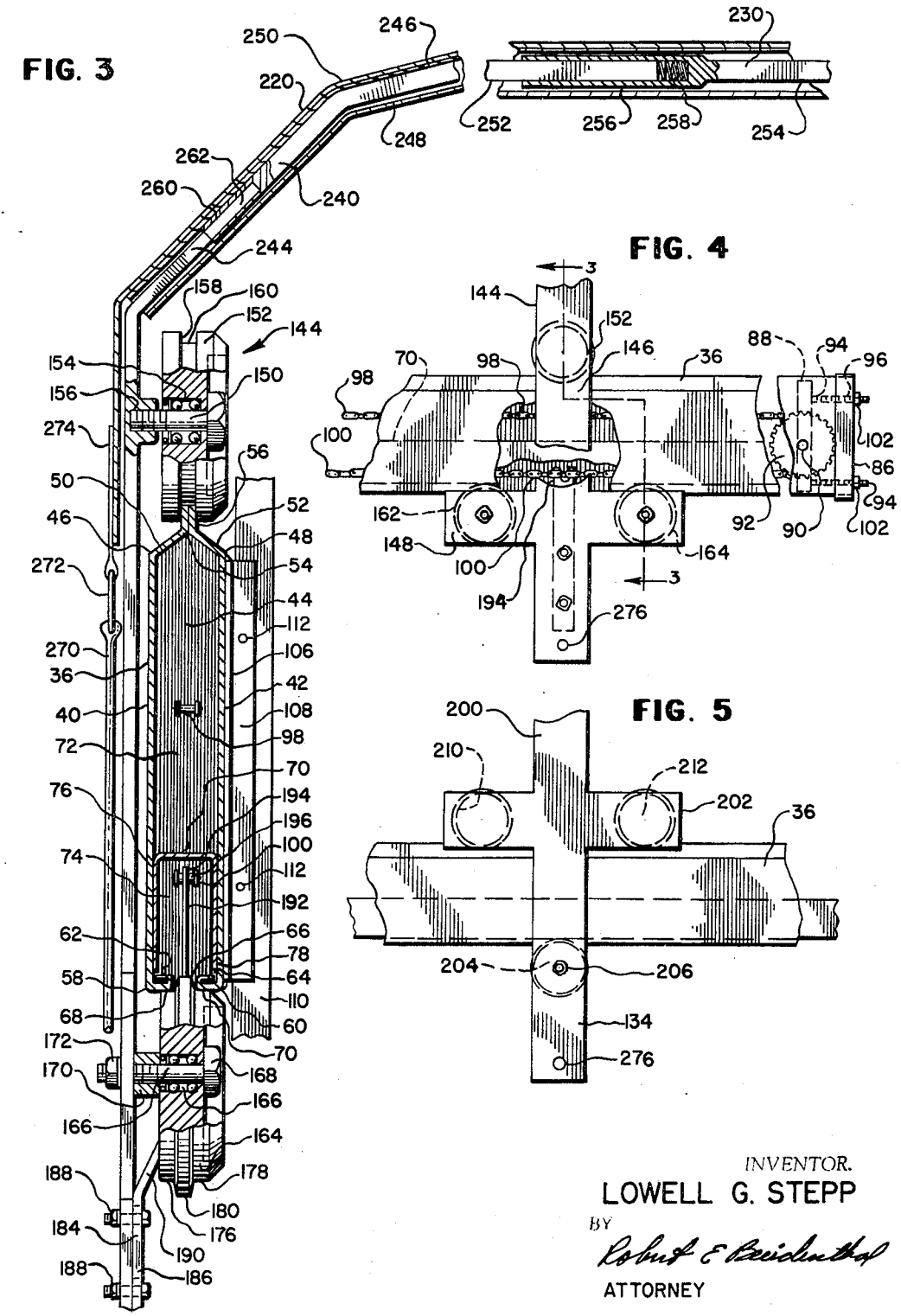
INVENTOR.
LOWELL G. STEPP
BY
*Robert E. Beidenthal*
ATTORNEY Dec. 2, 1969  L. G. STEPP  3,481,645
AUTOMATIC TRUCK BODY COVER
Filed Aug. 4, 1967  4 Sheets-Sheet 3
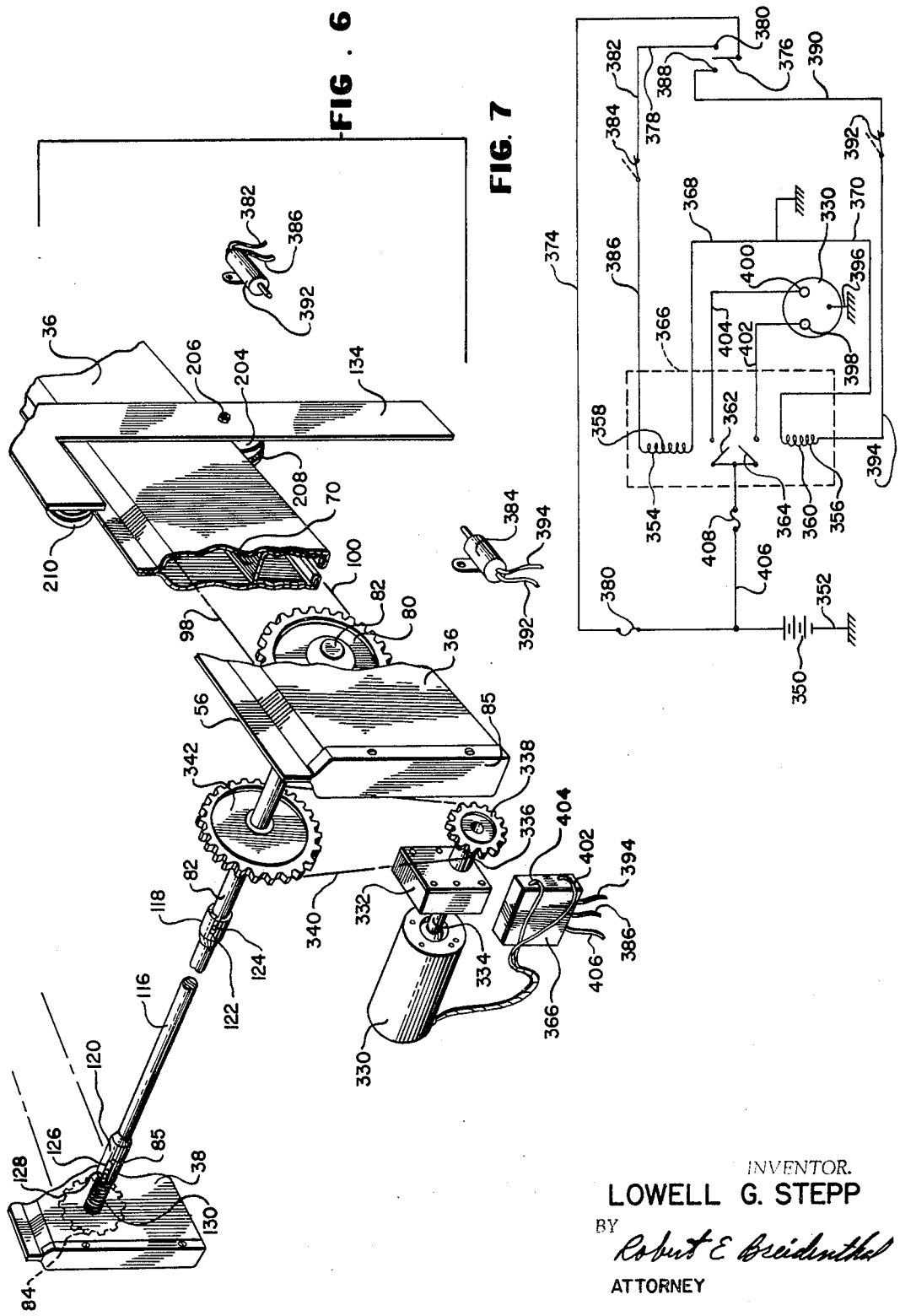
INVENTOR.
LOWELL G. STEPP
BY Robert E. Breidenthal
ATTORNEY Dec. 2, 1969  L. G. STEPP  3,481,645
AUTOMATIC TRUCK BODY COVER
Filed Aug. 4, 1967  4 Sheets-Sheet 4

INVENTOR.
LOWELL G. STEPP
BY
Robert E Breidenthal
ATTORNEY

United States Patent Office 3,481,645
Patented Dec. 2, 1969

3,481,645
AUTOMATIC TRUCK BODY COVER
Lowell G. Stepp, Syracuse, Kans. 67878
Filed Aug. 4, 1967, Ser. No. 658,414
Int. Cl. B60j 7/04, 7/06
U.S. Cl. 296—105                              18 Claims

ABSTRACT OF THE DISCLOSURE

A truck provided with a power driven extensible and retractable flexible roof or tarpaulin, such roof being supported on a plurality of bows mounted on a series of movable carriers. The movable carriers are supported and guided upon elongated hollow guides detachably mounted on the side walls of the truck bed. Each carrier has a grooved upper roller engaged on a rib on the top of the guide and a lower ribbed roller engaged in a slot on the bottom of the guide. The carriers of the rearmost bow are detachably connected to selected positions along a drive chain sheltered within the hollow guides by forks extending through the slots in the bottoms of the guides.

In order to reduce air movement between the rear end of the extended roof and the top of the tail gate, the latter is pivotally provided with a latchable closure member having an upper periphery conformable to the configuration of the rearmost bow.

The chains are entrained over driving and driven sprockets, the driving sprockets are fixed on a common drive shaft that is severable to facilitate detachment of the guides from the truck.

The bows are slidingly extensible to compensate for variations in guide spacing, especially such variations as may occur due to the side walls being bulged outwardly by cargo.

Electrical control means operable from the truck operator's position is provided which includes forward and reverse electric circuits, with switch means being provided for disabling such circuits respectively upon the rearmost bow reaching relatively forward and rear positions.

---

The present invention relates to new and useful improvements in support and guide means per se, and particularly pertains to such means in combination with power driven retractable and extensible collapsible roofs or tarpaulins for the cargo space of cargo carrying vehicles or trucks.

Numerous proposals have heretofore been made in connection with extensible and retractable tarpaulin covers for truck beds. An appreciation of the general character of proposals heretofore made and the purposes of such proposals may be obtained upon making reference to the following U.S. Letters Patents:

3,160,436, Dudleston, Tarpaulin Superstructure for Trailers, December 1964;
2,882,091, Shield, Collapsible Cover For Vehicle Beds, Apr. 14, 1959;
3,041,104, Richard, Device For Unrolling the Canvas Top of a Trailer Truck, June 26, 1962;
2,559,310, McNavage, Collapsible Cover For Vehicles, July 3, 1951; and,
2,469,958, Fowler, Motor Vehicle Cover, May 10, 1949.

The paramount object of the present invention is to provide a support and guide structure having a high degree of reliability, particularly in being virtually free of any susceptibility to being jammed or blocked by the intrusion of any foreign matter.

Another important object of the present invention is to provide a relationship between a tarpaulin supporting bow and guides supporting the opposite ends of the bow such as to possess a high degree of reliability notwithstanding relative movement of the guides such as may occur due to any variation in the spacing of the guides due to cargo loading, and the like.

Still another important object of the present invention is to provide an extensible tarpaulin cover in such a combination with a truck that air movement within the covered area be minimized, and especially so that air movement between the rear end of the extended tarpaulin cover and the endgate of the truck be minimized.

Yet another important object of the invention is to provide a guide and carrier such that a rolling engagement is established between the carrier and the guide with such rolling engagement being such as to serve the guiding and supporting function and such engagement being established along surfaces not readily susceptible to the interpositioning of or retention of obstructing foreign matter.

Another object closely related to the last mentioned object is to provide a guide and carrier such that relative angular movement about any axis is precluded or extremely limited, it is preferable and therefore a further object of the present invention to attain such objective in such a manner that a series of carriers can be relatively movable on a single guide, with such carriers being such as to be at least partially nested with respect to each other so as to minimize the extent of the guide occupied by the series of carriers.

A final important object of the present invention to be specifically enumerated is to provide a power driven extensible and retractable tarpaulin or flexible roof cover for a truck with operative controls accessible to the truck operator with such operative controls being made inoperative to retract or extend the tarpaulin when the latter is fully retracted and fully extended respectively.

A broad aspect of the invention involves the provision of apparatus for supporting, guiding and moving a carrier comprising an elongated and horizontally extending hollow guide, said guide having a longitudinally extending slot opening into the interior thereof, a carrier disposed at a side of the guide and provided with vertically spaced upper and lower rollers respectively disposed above and below the guide to engage the top and bottom of the guide, a pair of chain sprockets mounted adjacent opposite ends of the guide, an endless chain disposed within the guide and entrained over the sprockets, and means extending through the slot and operatively connecting the carrier and the chain.

Another broad aspect of the invention involves, in apparatus for the guided support and movement of a retractable and extensible flexible roof structure of the type including a pair of parallel elongated support guides adapted to be mounted horizontally on the opposite sides of the roof-coverable area, and roof bow support means guidingly supported on the guides, the improvement comprising each of said guides being hollow and having an endless drive chain extending therein within the hollow thereof, sprockets carried by the guide adjacent the opposite ends thereof with said endless chain being entrained over said sprockets, each of said bow support means including a supported and guided member, vertically spaced laterally projecting stub axles on said member, an upper roller rotatably mounted on the uppermost of said stub axles, said upper roller being disposed on top of the guide and in peripheral rolling engagement thereon, with the top of the guide and the circumferential periphery of the upper roller having meshing rib and groove means for preventing axial movement of the upper roller relative to the guide, a lower roller rotatably mounted on the lowermost of the stub axles, said lower roller being disposed on the bottom of the guide and in close peripheral rolling proximity thereto, with the bottom of the guide and the circumferential periphery of the lower roller having meshing rib and groove means for preventing axial movement of the lower roller relative to the guide, said guide having a longitudinally extending slot therein opening into said hollow, an upright member of at least one of said support means having an operative connection with the chain through said slot.

Still another important aspect of the invention involves, in the combination of a self-propelled cargo vehicle of the type including a truck bed having an upstanding front and end wall, spaced upstanding side walls, and a rectangular endgate pivotally mounted along an edge to the rear edge of the truck bed with a retractable and extensible roof of flexible material having a front edge secured to the front end wall and supported by a series of relatively movable bows supported and guided for forward and rearward movement upon guides carried by the side walls; the improvement wherein each of the bows is generally of an inverted U-shaped configuration including depending leg portions connected by a web portion, and wherein the bows are supported and guided by a pair of longitudinally hollow guides carried by and extending along the side walls, each leg portion of each bow being provided with a carrier movably mounted on one of said hollow guides, said hollow guide having a longitudinally extending slot in the bottom thereof opening into the hollow interior of the guide, said hollow guide having a longitudinally extending rib along the top thereof, said carrier having an upper roller on the top of the guide, such upper roller having a peripheral groove receiving the rib therein, said carrier having a lower roller on the bottom of the guide, such lower roller having a peripheral rib received in the slot, driving and driven chain sprockets mounted on the guide adjacent the opposite ends of the guide, and an endless chain within the hollow guide and entrained over the sprockets, means operatively connecting the carriers of the leg portions of the rearmost bow to the chains within the guides, the last recited means extending through the slots of the guides, and means for reversibly driving the driving sprockets in unison.

An important feature of the present invention resides in the provision of a hollow guide constituting a housing for an endless chain, the top of the housing being formed as a rib received in a grooved roller of a carrier, and the bottom of the guide being provided with a slot for receiving a ribbed roller of the carrier, such slot in addition to serving a guiding function also serving the function of accommodating a driving connection between the endless chain and the carrier. An associated feature resides in the driving connection between the endless chain and the carrier taking the form of a forked element carried by the carrier and engageable with a selected portion of the extent of the endless chain.

Another important feature of the invention resides in adjacent carriers being alternately provided with single upper and dual lower rollers, and vice versa, whereby the carriers can be at least partially nested with each other as to the longitudinal extent of the guide.

Still another important feature of the invention resides in the provision of a closure wall pivoted on the conventional tail gate of the truck for selectively closing the space between the top of the tail gate and the rearmost edge portion of the tarpaulin, whereby air movement or drafts through such space can be greatly reduced and thereby minimize any possibility of loss of cargo, such as grain, over the tail gate.

A final feature of importance to be specifically enumerated resides in the provision of means for interrupting selectively electrical circuits controlling extension and retraction of the tarpaulin when the tarpaulin is fully extended and fully retracted, respectively.

These and other objects, aspects and features of the invention will become manifest during the ensuing description of the preferred embodiment of the invention, such description to be taken in conjunction with the accompanying drawings, wherein:

FIGURE 3 is a broken and enlarged sectional detail view taken upon the plane of the broken section line 3—3 of FIGURE 4, portions of the structure being shown in side elevation;

FIGURE 4 is an enlarged fragmentary side elevational view of the rear end portion of one of the guides and of the rearmost carrier on such guide, portions of the structure being broken away and shown in dashed outline to reveal hidden details;

FIGURE 5 is an enlarged fragmentary side view of a portion of one of the guides and of one of the carriers mounted thereon, portions of the structure being shown in dashed outline to reveal hidden details thereof;

FIGURE 6 is a broken isometric view of the forward end of the guides, the means for driving the sprockets, and the limit switches constituting a part of the controlled drive of the chain, portions of the structure being broken away to reveal hidden details;

FIGURE 7 is a schematic diagram of the electrical circuitry of the electrical driving means;

Figure 1:
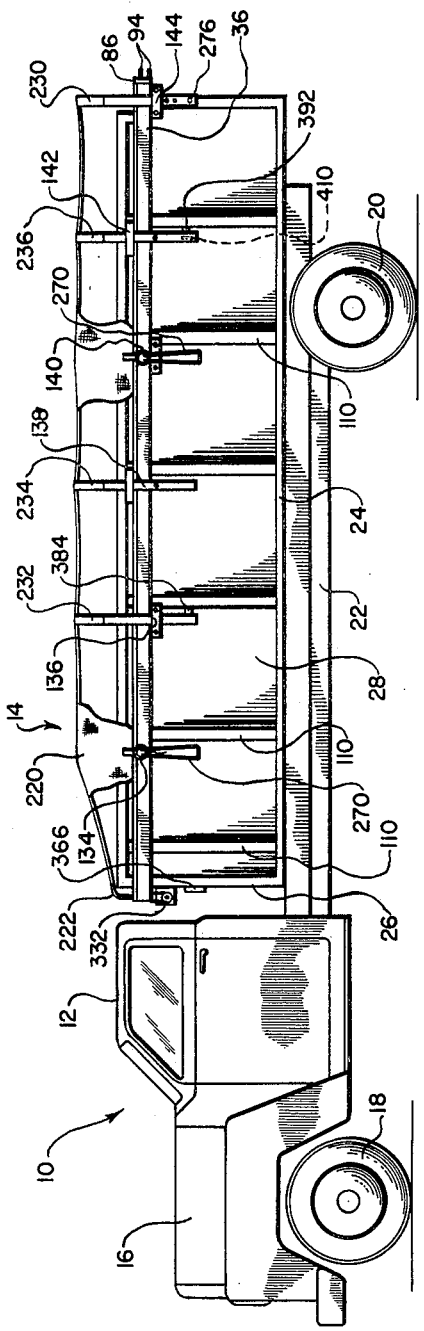
FIGURE 1 is a side elevational view of a truck provided with the extensible and retractable tarpaulin structure of this invention, this view showing the tarpaulin in extended position, with portions of the tarpaulin being broken away.

Referring now to the drawings wherein like numerals designate like parts throughout the various views, the reference numeral 10 designates generally a self-propelled cargo vehicle or truck which, as is conventional, includes an operator's cab 12 from within which the truck operator, not shown, can control or operate the truck 10 as well as a flexible roof structure designated generally at 14 of extensible and retractable character by means presently to be described. As is conventional, the truck 10 includes an engine compartment 16, dirigible front wheels 18, and rear drive wheel 20.

The truck 10 also includes, as is conventional, a frame 22 upon the rear portion of which is mounted a rectangular truck bed 24 at the forward end of which is an upstanding front wall 26 that extends between the forward edges of spaced side walls 28 and 30 upstanding along the opposite sides of the truck bed 24. A conventional endgate 32 extends upwardly from the rear end of the truck bed 24 and between the rear end edges of the side walls 28 and 30. The endgate 32 can be immovable with respect to the truck bed 24 and the side walls 28 and 30, as shown, or alternatively the endgate 32 can be pivotally connected if desired along its lower edge to the truck bed 24. Though not illustrated in the drawings, it is to be understood that, as is conventional, the truck bed 24 can be pivotally mounted upon the frame 22 and provided with hydraulic actuators and control means whereby the same can be tilted about a transverse horizontal axis adjacent the rear end of the truck bed 24 in a clockwise direction to a dumping position.

Although not constituting a part of the present invention per se, it will be appreciated by those familiar with the art that the front wall 26, the side walls 28 and 30 as well as the endgate 32 may include detachable upper extensions, whereby the volume of the cargo to be carried by the truck 10 can be increased. Such provision of vertical extensions for front and side walls, as well as for endgates, is quite commonplace upon trucks such as employed by farmers for use in carrying grain such as wheat, and the like.

Thus far, excepting only the roof structure 14 briefly alluded to, the structure is entirely conventional and does not in and of itself constitute the subject matter of the present invention.

With the foregoing description of conventional truck construction as a background, the subject matter constituting the present invention will now be described.

The roof structure 14 is provided with means for guiding and supporting the same, such means including a pair of elongated hollow guides 36 and 38. The elongated hollow guides 36 and 38 are horizontally disposed and are positioned outwardly from the opposite sides of the side walls 28 and 30 at a position adjacent the upper edges of such side walls. As will be noted on inspection of FIGURES 1 and 2, the guides 36 and 38 are somewhat longer than the truck bed 24 and extend from positions in advance of the forward wall 26 to positions rearwardly of the endgate 32. The guides 36 and 38 are identical to each other, being mirror images of each other, and a detailed description of the guide 36 will suffice for both of the guides 36 and 38.

As best shown in FIGURE 3, the guide 36 comprises parallel vertical sides 40 and 42 that are spaced apart to define the hollow interior 44 of the guide 36, the spacing of the sides 40 and 42 being substantially less than the vertical extent of such sides 40 and 42 as will be plainly apparent on inspection of FIGURE 3. Adjacent the upper end of the guide 36, the sides 40 and 42 are bent at 46 and 48 to converge upwardly at 50 and 52 respectively, and from their position of convergence 54, the sides 40 and 42 extend a short interval upwardly in flush engagement with each other to define an upstanding rib 56 that extends centrally along the top of the guide 36 for the entire longitudinal extent of the guide 36. The side walls 40 and 42 of the guide 36 are formed of sheet steel, and the flush portions thereof constituting the rib 56 are suitably welded together, as by spot welding or the like, so as to constitute an integral structure.

The lower marginal portions of the side walls 40 and 42 are inwardly bent as at 58 and 60, respectively, and the lowermost margins are inwardly crimped or folded upon themselves as at 62 and 64, the arrangement being such as to reinforce or rigidify the lower part of the guide 36 and to define an opening or longitudinally extending slot 66 between the crimped portions 62 and 64 opening centrally from the bottom of the guide 36 upwardly into the hollow interior 44 of the guide 36. Additionally, the folded and crimped lower portions of the side walls 40 and 42 serve to defiene downwardly facing rolling contact surfaces 68 and 70 on the opposite sides of the slot 66.

A horizontal and longitudinally extending partition 70 is disposed within the hollow interior 44 of the guide 36, the same being spaced above the slot 66 and being spaced below the position of convergence 54, and preferably more closely spaced to the slot 66 as shown. The partition 70 serves to divide the hollow interior 44 of the guide 36 into upper and lower portions 72 and 74 as shown. Preferably, the partition 70 is the web portion of a longitudinally extending member that is of an inverted U-shape transverse section including legs 76 and 78 seated flush against and suitably secured as by spot welding or the like to the adjacent faces of the side walls 40 and 42. Preferably, the leg portions 76 and 78 connected by the web 70 have their lower edges disposed in close proximity to the crimped portions 62 and 64, as shown. The parti-tion or web 70 serves to reinforce the side walls 40 and 42 and to maintain the spacing of the side walls 40 and 42, especially adjacent the slot 66. The partition 70 serves yet another function that will be subsequently described.

The horizontal partition 70 only extends an intermediate portion of the longitudinal extent of the guide 36, and adjacent the forward end of the guide 36 and forwardly of the forward end of the partition 70 there is a chain sprocket 80 disposed within the hollow interior 44 of the guide 36, such chain sprocket 80 being disposed on a shaft 82 journaled through the side walls 40 and 42. In a similar manner, a chain sprocket 84 is provided within the forward end portion of the guide 38, the sprocket 84 being fixed to a shaft similarly journaled through the side walls of the guide 38. The front end of the hollow guide is closed by a cup 85 removably fitted thereover and removably held in place by the screws shown.

The rear end of the guide 36 is closed by a cup 86 removably fitted thereon (see FIGURE 4), and a slide 88 is disposed within the rear end of the hollow interior 44 of the guide 36, such slide 88 being longitudinally movable within the guide 36. The slide 88 is disposed rearwardly of the rearmost end of the partition 70, and such slide 88 is hollow and has an axle fixed therein, and a chain sprocket 92 is journaled for rotation on the axle 90. The slide 88 is provided with a pair of rearwardly extending threaded members 94 that are fixed thereto, and such threaded members 94 extend through aligned apertures 96 in the closure cup 86. An endless chain including upper and lower flights 98 and 100, respectively, is entrained over the sprockets 80 and 92, the chain being disposed in the hollow interior 44 of the guide 36, with the upper and lower flights 98 and 100 thereof being respectively disposed in the upper end lower portions 72 and 74 of the hollow interior 44. The arrangement is such that the chain may be adjusted to obtain or maintain the desired degree of tautness or tension by the tightening of nuts 102 on the threaded members 94. It is not essential that the chain be maintained under a particularly great degree of tension in order to maintain separation of the upper and lower flights 98 and 100 inasmuch as the partition 70 maintains separation of the upper and lower flights 98 and 100 of the chain. Indeed, the chain may be sufficiently relaxed in tension so that an intermediate portion of the upper flight 98 thereof slides upon and is supported by the partition 70. It should be noted at this juncture of the description that the transverse width of the slot 66 is substantially less than that of the chain so that the latter can slide upon and be supported by the crimped portions 62 and 64 of the side walls 40 and 42 without passing downwardly through or even into the slot 66.

At spaced positions along the longitudinal extent of the guide 36, there are attached as by welding or the like vertical lengths of angle iron 106 so as to provide longitudinally spaced vertically extending flanges 108 directed toward the side wall 28 of the truck 10. The side wall 28 (as is similarly true of the side wall 30) includes vertically extending members such as those indicated at 110 (see FIGURES 1 and 3), and the longitudinally spaced flanges 108 are seated against the rear vertical sides of the members 110, the flanges 108 and the members 110 being similarly spaced, and as shown in FIGURE 3, the flanges 108 are detachably secured to the members 110 by means of threaded fasteners indicated at 112. The members 110 can be either wood or steel, and the threaded fastening means 112 can either be threaded into suitably positioned internally threaded apertures in the members 110, or the threaded means 112 can be nuts and bolts passing through the flanges 108 and the members 110. It will be evident to those familiar with the art that the members 110, at least the portions thereof to which the flanges 108 are attached, can constitute portions of removable vertical extensions such as conventionally employed in trucks to enable vertically extending the side walls 28 and 30. It will also be evident that when the portions of the members 110 to which the flanges 108 are attached are detachable from the lower portion of the side wall 28, such detachable portion of the side wall 28 can be removed from the side wall 28 along with the guide 36 as a unit. From the foregoing, it will be clear that the guide 38 is not only similarly attached to the upper portion of the side wall 30, but that the guide 38 can also be detachably removed along with the upper detachable portion of the side wall 30, should the latter be detachable as previously described in connection with the side wall 28.

The guides 36 and 38 are mounted upon the side walls 28 and 30 of the truck in such a manner that the shafts 82 and 85 of the sprockets 80 and 84 are in alignment and at a position forward of the front wall 26 of the truck 10. Means is provided for detachably coupling the shafts 82 and 85 so that the sprockets 80 and 84 can be compelled to rotate in unison. The desirability for the provision of means for detachably coupling the shafts 82 and 85 resides in the fact that such detachable coupling enables the guides 36 and 38 to be individually removed or attached to the truck 10 either as separate units or as units attached to upper detachable portions of the side walls 28 and 30 as previously mentioned. The means for detachably coupling the shafts 82 and 85 comprises a connecting shaft 116 provided with socket portions 118 and 120 at its opposite ends which respectively slidingly receive the adjacent ends of the shafts 82 and 85. The socket portion 118 is provided with a longitudinally extending slot 122 into which is received a radially extending pin 124 fixed to the shaft 82. The arrangement is such that the connecting shaft 116 can be moved to the left as viewed in FIGURE 6 to disconnect the shafts 82 and 116, but that when the shaft 116 is axially moved to the right so as to receive the shaft 82 in the socket portion 118 with the pin 124 disposed in the slot 122, the shafts 82 and 116 are not only maintained in alignment, but are compelled to rotate in unison.

In a similar manner, the socket portion 120 is provided with a slot 126 which receives a pin 128 fixed to the shaft 85. A coiled compression spring 130 embraces the shaft 85 and is biased between the extremity of the socket member 120 facing the guide 38 and the guide 36. The arrangement is such that the spring 130 yieldingly urges the shaft 116 to the right as viewed in FIGURE 6. The spring 130 causes such movement of the shaft 116 that the shaft 82 bottoms out in the socket portion 118. The dimensions of the socket portion 120 of the connecting shaft 116 are such that when the shaft 82 is bottomed out in the socket portion 118, the shaft 85 is not bottomed out within the socket portion 120, but the pin 128 is disposed within the slot 126. It will be understood that when it is desired to decouple the shafts 82 and 85 from their coupled relationship shown in FIGURE 6, the connecting shaft 116 is moved to the left as viewed in FIGURE 6 against the bias of the spring 130 to an extent sufficient to free the shaft 82 from the socket portion 118, whereupon the socket portion 118 is moved laterally a sufficient amount to allow the shaft 118 to then move to the right and free the shaft 85 from the socket portion 120. In the preferred construction the pin 126 is of a length sufficient to prevent removal of and possible misplacement of the spring 130. With the connecting shaft 116 being removed so as to decouple the shafts 82 and 85, the guides 36 and 38 are separably removable from the truck 10.

Each of the guides 36 and 38 is provided with a plurality of carriers, and inasmuch as the set of carriers provided for each of the guides 36 and 38 are identical, being mirror images of each other, a detailed description of the set of carriers provided in relation to the guide 36 will suffice for both such sets of carriers. The guide 36 is provided with carriers 134, 136, 138, 140, 142 and 144. Such carriers are basically of two types, the carriers 134, 138 and 142 being identical except with respect to an additional provision made with respect to the carrier 134 that will be brought out presently. Similarly the carriers 136, 140 and 144 are identical to each other except for the special additional provision made with respect to the carrier 144 that will also be brought out subsequently. It will be noted that the individual carriers of the two different types are alternately positioned along the longitudinal extent of the guide 36. Though equal numbers of the two types of carriers are shown in the drawings, such is not essential, it only being necessary for a reason set forth later that the type of carrier 144 be rearmost in the series of carriers.

The type of carriers indicated at 136, 140 and 144 are identical as previously explained, and a description of one of such carriers will suffice for all, and accordingly, attention is directed to FIGURES 3 and 4 for an understanding of the structure of the carrier 144. The carrier 144 is generally of a cruciform configuration being comprised of an integral steel vertical member 146 and a horizontal member 148. It will be noted that the vertical member or portion 146 of the carrier 144 extends above and below the horizontal member or portion 148. The cruciform structure comprised of the members 146 and 148 is disposed on the side of the guide 36 opposite the side wall 28 of the truck 10, and is spaced from the side wall 40 of the guide as clearly shown in FIGURE 3. The cruciform structure has a vertical extent greater than that of the guide 36, the horizontal portion 148 thereof being disposed at a height somewhat less than the bottom of the guide 36, and the vertical portion 144 is provided with a stub axle 150 that projects laterally from the carrier portion 144 horizontally above the top of the guide 36, and a roller or wheel 152 is rotatably mounted on the stub axle 150 as by antifriction means indicated at 154. In the preferred construction, the stub axle 150 takes the form of a headed member that is threaded into an internally threaded boss formed integrally with the carriage portion 144 as indicated at 156. Such construction enables the roller 152 and the antifriction means 154 to be removed for purposes of inspection, lubrication, repair, replacement or the like. Whereas the roller 152 is illustrated as being formed of metal such as steel, such construction is not essential as will be evident to those skilled in the art, and if desired the roller 152 can be of a synthetic resin or plastic material formed by injection molding or the like, and for such purpose nylon as well as other materials can be employed. If the roller 152 is made of a synthetic resin such as nylon, the provision of antifriction bearing means 154 can be eliminated and the roller directly journaled on the stub axle 150 in view of the well known low friction characteristics as between steel and synthetic resins such as nylon. When nylon rollers are used, it is more convenient and preferred that the stub axles be welded to the carriage with a nylon or brass washer interposed between the carriage side and the nylon roller. The nylon roller can be releasably retained on the axle by a steel or brass washer and a removable keeper such as cotter pin or split spring ring extending through the axle or seated in an annular groove, as will be evident to those skilled in the art.

The roller 152 is provided with a peripheral groove 158 having a bottom 160, and the upstanding longitudinally extending rib 56 on the top of the guide 36 is received within the groove 158 with the upper edge of the rib 56 bearing against the bottom 160 of the groove 158.

The illustrated relationship of the roller 152 to the guide 36 is such that the sole contact or engagement between the roller 152 and the guide 36 is that between the upstanding rib 56 and the peripheral groove 158. It will be understood that the periphery of the wheel 152 could be such that the same would mate or mesh with the upper surfaces of the inclined portions 50 and 52 of the side walls 40 and 42; however, such is not preferred for the reason that foreign matter could lodge or possibly be retained upon such surfaces with consequent interference to free rolling of the roller 152 along the top of the guide 36. It will be evident that the accumulation or retention of foreign matter along the upper edge of the rib 56 is much less likely to occur. It will be noted that the relationship of the rib 56 to the groove 158 is such as to prohibit axial movement of the roller 152 and consequently any such corresponding movement of the carrier portion 146 so long as the rib 56 is received in the groove 158.

The horizontal portion 148 of the carrier 144 is provided with horizontally spaced lower rollers 162 and 164 that are disposed directly below the hollow guide 36, such rollers 162 and 164 being disposed on opposite sides of the vertical portion 146 of the carrier 144, the arrangement being such that the lower rollers 162 and 164 are equally distantly spaced forwardly and rearwardly, respectively, of the roller 152. The rollers 162 and 164 are identical and are mounted on identical fashion upon the horizontal portion 148 of the carrier 144. As will be seen in connection with the roller 164 shown in FIGURE 3, the roller 164 is mounted for rotation by antifriction means 166 on a stub axle 166. The stub axle 166 is illustrated in the drawings as being in the form of a headed bolt 168 extending through the antifriction means 166, a spacer 170 and through a suitable aperture in the horizontal carrier portion 148, such headed bolt 168 being detachably fixed to the carrier 144 by a nut 172. As in the case of the upper roller 152, the rollers 162 and 164 can be readily removed for inspection, repair, lubrication or replacement, as desired.

The rollers 162 and 164 are as mentioned previously identical to each other and bear the same relationship to the guide 36, and as shown in FIGURE 3 in connection with the roller 164, the roller 164 has peripheral profile defined by cylindrical portions 176 and 178 disposed to about in rolling contact the undersurfaces 68 and 70 of the guide 36 that are on opposite sides of the slot 66. The peripheral profile of the roller 164 is additionally defined by a radially extending peripheral rib 180 disposed between the cylindrical portions 176 and 178, the axial extent of the rib 180 being such as to slidingly be received in the slot 66, the arrangement being such that the rollers 162 and 164 are guided by the reception of the rib 180 in the slot 66, the rib 180 and the slot 66 constituting in effect rib and groove guiding means. It is to be particularly noted that it is extremely unlikely that foreign matter could be received or retained in any such position as to impede free rolling movement of the rollers 162 and 164 along the bottom of the guide 36.

As thus far described all the carriers 136, 140 and 144 are identical in structure and in their relationship to the guide 36. It will be noted that in each instance the carriers have no freedom of movement other than linear translation along the extent of the guide 36, and it is to be particularly noted that the location of the upper roller as being intermediate the longitudinal positions occupied by the lower rollers precludes any rotation of the carrier about any horizontal axis perpendicular to the longitudinal extent of the guide 36. Not only is linear translation of the carriers prevented in all directions except along the longitudinal extent of the guide 36, it will also be obvious that the carriers are precluded from rotational movement about any axis.

Unlike the carriers 136 and 140, the carrier 144 is additionally provided with means extending through the slot 66 operatively connecting the carrier 144 to the lower flight 100 of the endless chain. Such means are to be seen in FIGURES 3 and 4, and comprises a steel strap or bar 184 having a lomer portion 186 secured in vertically adjusted relation to the lower portion of the vertical portion 146 of the carriage 144 by means of nuts and bolts 188 extending through aligned slots and apertures provided in the lower vertical portion 146 of the carriage 144 and the lower portion 186 of the strap or bar 184. Above its position of adjustable attachment to the vertical portion 176, the strap 184 includes an upwardly inclined portion 190 that terminates in a vertical portion 192 that extends upwardly through the slot 62 into the lower portion 74 of the hollow interior of the guide 36. The upper end of the upstanding offset portion 192 of the strap 184 is bifurcated to constitute a fork 194. As best shown in FIGURE 3, the fork 194 is intermeshed with cross links or rollers 196 of the lower chain flight 100.

As thus far described, it will be seen that the slot 66 not only serves a guiding function in combination with the ribs 180 of the lower wheels 162 and 164 of all the carriers 136, 140 and 144, but additionally such slot 66 enables an operative connection between the carrier 144 and the chain notwithstanding the fact that the chain is housed within the hollow interior of the guide 36. It will be clear in view of the foregoing that the adjustable connection between the strap 184 and the lower carrier portion 146 enables the carrier 144 to be operatively connected to a selected position along the longitudinal extent of the lower chain flight 100. It is to be understood that the lower chain flight 100 and the fork 194 engage the chain in the center of all roller friction eliminating any side draft on the carriage rollers causing them to bind and not run free on the guide 36.

It is to be understood that the rearmost carrier of the carriers associated with the guide 38 is similarly provided with means operatively connecting the same to the chain within the guide 38.

Proceeding now to a description of the carriers 134, 138 and 142, a detailed description of the carrier 134 will suffice for all. As best shown in FIGURES 5 and 6 the carrier 134, like the carrier 144, includes an integral cruciform member comprised of a vertical portion 200 and a horizontal portion 202, the structure 134 differing from the basic structure of the carrier 144 in that the horizontal portion 202 is disposed adjacent the top of the guide 36. The carrier 134 is provided with a lower roller 204 that is disposed directly below the guide 36, the roller 204 being mounted for rotation by means 206 to the vertical carrier portion 200, such means 206 being generally similar to the means previously described in the rotatable mounting of the rollers 162 and 164. Also like the rollers 162 and 164, the roller 204 has a peripheral profile identical to that of the roller 164 so as to roll against the underside surfaces 68 and 70 of the guide 36, and the roller 204 includes a radially extending peripheral rib 208 received in the slot 66 in the same manner as the rib 180 is received.

The carrier 134 includes a pair of upper rollers 210 and 212 that are disposed directly above the guide 36 and which are equidistantly spaced forwardly and rearwardly, respectively, of the lower roller 204. The rollers 210 and 212 have peripheral profiles identical to that of the previously described roller 152 and bear the same relationship to the guide 36 as that previously described as existing between the roller 152 and the guide 36. Furthermore, the upper rollers 210 and 212 of the carrier 134 are disposed adjacent the opposite extremities of the horizontal carrier portion 202 and are mounted on rotation thereon in the same manner as that previously described in connection with the mounting of the roller 152.

From the foregoing, it will be seen that the rollers 210 and 212 have peripheral grooves such as the peripheral groove 158 of the roller 152 so as to receive the rib 56 therein so as to support and guide rolling movement of the rollers 210 and 212. As in the case of the previously described rollers 152, 162 and 164, the rollers 204, 210 and 212 can if deemed necessary or expedient be made of synthetic resins such as nylon or the like, and can be directly journaled on stub axles without the interpositioning of any antifriction means such as ball or roller bearings. As in the case of the carrier 144, the freedom of movement of the carrier 134 is limited solely to linear translation along the longitudinal extent of the guide 36, and the carrier 134 is constrained against any rotation.

The extensible and retractable flexible roof structure 14 comprises a large generally rectangular flexible sheet of material of waterproof character such as the material of which tarpaulins are conventionally fabricated, such as heavy cotton duck or nylon material impregnated and coated with conventional waterproofing materials, such rectangular sheet of flexible material or tarpaulin being indicated at 220. The tarpaulin 220 has its greatest dimension extending forwardly and rearwardly and is somewhat greater than the overall longitudinal extent of the truck bed 24. The minor or transverse dimension of the tarpaulin 220 is somewhat greater than the spacing of the side walls 28 and 30 of the truck 10. The forward edge of the tarpaulin is suitably secured by conventional means to the upper edge portion of the front wall 26 at 222. Preferably the tarpaulin is detachably secured at 222 by conventional snap fasteners for a purpose presently to appear. In the event that the upper marginal portion of the front wall 26 is detachable from the lower part of the front wall 26, the tarpaulin 220 can be removed from the truck 10 therewith as a unit. As is the conventional practice in the case of fabric covers or roofs for truck beds, whether such fabric or tarpaulin roof structures are retractable or not, such tarpaulin covers are supported along the length of the truck bed by a series of spaced bows when the tarpaulin extends the length of the truck bed, the spacing of the bows and the positions at which the bows are attached to the tarpaulin being such that the tarpaulin is under some degree of longitudinal tension sufficient to prevent any substantial degree of sagging intermediate the bows. Broadly speaking, the tarpaulin 220 is connected to and supported by bows in the conventional manner, the bows being received within pockets extending transversely across the underside of the tarpaulin so as to prevent vertical separation of the bow from the tarpaulin as well as to prevent relative longitudinal movement of the tarpaulin with respect to the bow.

In general all the bows employed in the support of the tarpaulin 220 of the present invention are identical to each other and identical in their connection or relationship to the tarpaulin 220 and also with respect to their relation to pairs of carriers of the guides 36 and 80. Accordingly, a detailed description of the rearmost bow 230 which is associated with the rearmost carrier 144 on the guide 36 and the rearmost carrier counterpart of the guide 38 will suffice for the bows associated with all the other carriers such as the bows 232, 234 and 236 respectively associated with the carriers 136, 138 and 142 and the counterparts of such carriers on the guide 38. The bow 230 is of a generally inverted U-shaped configuration including a web or central portion 238 extending between depending leg portions 240 and 242 at its opposite ends. The upper ends of the vertical portions 146 of the carrier 144 and its counterpart on the guide 38 are inclined upwardly toward the side walls of the truck as indicated at 244 in FIGURE 3, the angle of upward inclination being the same as that of the leg portions of the bow 230. It will be noted that the upper vertical end portions of all the carriers of both types are similarly upwardly inclined toward the center of the truck for connection to their respective bows as hereinafter described in connection with the bow 230 and its connection to the carrier 144 and its counterpart on the guide 38.

The tarpaulin is along its extent such as to correspond to the position of the bow 230 provided with a pocket extending thereacross as previously mentioned, such pocket being shown as including upper and lower portions 246 and 248 between which the bow 230 is slidingly received, the pocket including the portions 246 and 248 are attached to an overlying thickness of the tarpaulin 220 indicated at 250. It will be understood that the pocket or loop inclusive of the pocket portions 246 and 248 are disposed on the underside of the continuous extent of the tarpaulin 220 and that the same can conveniently be formed of the same character of impregnated fabric and be flexible therewith, the arrangement being such that the bow 230 can be slidably extended through the pocket so that the leg portions 240 and 242 can project outwardly from the opposite ends of the pocket. For a purpose presently to be described, the web or central portion 238 of the bow 230 is formed of two sections 252 and 254 that are connected in a telescoping fashion as clearly illustrated in FIGURE 3, the web portion section 252 being slidably and extensibly received within a socket structure 256 integral with the bow section 254. A coiled compression spring 258 is received within the socket structure 256 so as to yieldingly urge extension of the bow section 252 outwardly from the socket structure 256.

The leg portions 240 and 242 of the bow 230 are provided with recesses therein such as indicated at 260 with respect to the leg portion 240, which recesses 260 slidingly receive therein reduced end portion 262 of the carrier 144 and its counterpart on the guide 38.

In order to maintain the tarpaulin 220 taut over the extent of the bow 230, the opposite ends of an elongated elastic band or strap 270 are attached to a ring 272, the ring in turn being attached to a peripheral edge portion of the tarpaulin 220 by means of a tab 274 stitched or otherwise suitably secured to the tarpaulin 220, it being understood that the position of the ring 272 is in transverse alignment with the pocket in which the bow 230 is disposed. The elongated elastic member 270 is releasably tensioned to be engaged about the underside of a protruding pin or knob 276 adjacent the lower end of the vertical carrier portion 146. It will be appreciated that all the carriers are provided with such pins and coact with similar elastic members for maintaining the tarpaulin 220 tensioned over the respective bows.

The previously described spring biased telescoping web portion 238 of the bow 230 (such feature being common to all the bows) is for the purpose of accommodating the extent of the bow 230 to such variation in the spacings of the guides 36 and 38 as may occur on the side walls 28 and 30 tending to be bulged apart by cargo carried upon the truck bed 24, it being noted that such spreading can readily occur in connection with somewhat fluid cargoes such as wheat unless the sidewalls 28 and 30 are extremely rigid.

Figure 2:
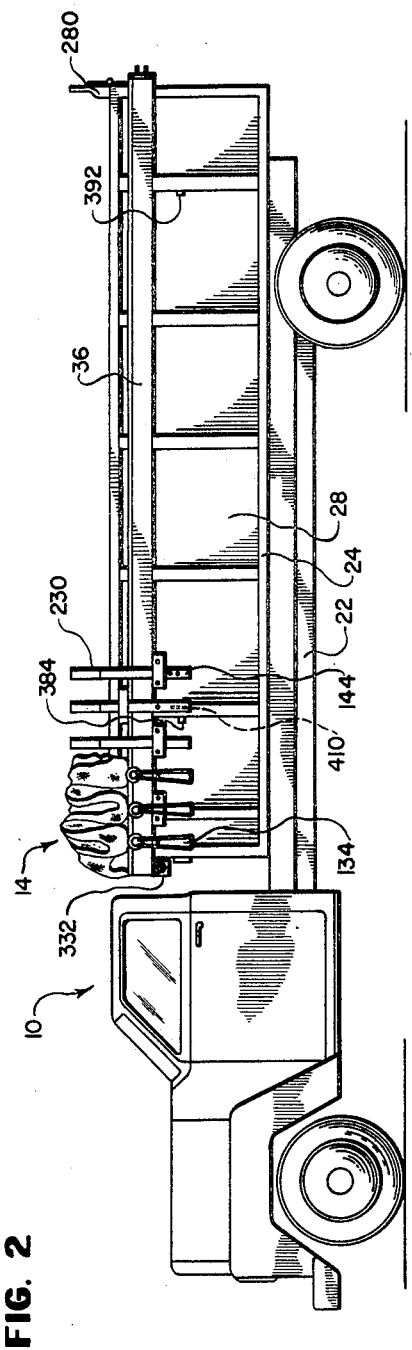
FIGURE 2 is a view similar to FIGURE 1; however, this view showing the tarpaulin in a nearly fully retracted condition, and with portions of the tarpaulin broken away.

As thus far described the operation of the extensible and retractable roof will be readily understood. Assuming that the bows and the tarpaulin 220 are disposed as shown in FIGURE 1 as an initial condition, with the carrier 144 and its counterpart on the guide 38 are appropriately coupled to the lowermost flights 100 of the chains within the guides 36 and 38, rotation of the shafts 82 and 85 in a clockwise direction as seen in FIGURE 6 will result in the chain causing the rearmost carriers to be forcibly urged forwardly on their respective guides at equal rates. This results in forward movement of the bow 230 which carries along therewith the rearmost edge of the tarpaulin 220. Continued forward movement of the bow 230 will continue until the carrier 144 approaches the position shown in FIGURE 1 of the carrier 142 whereupon either direct engagement of the carriers 144 and 142 and/or some degree of compression of the intervening extent of the tarpaulin 220 will cause forward movement of the bow 236 along with the bow 230, it being appreciated that the intervening extent of the tarpaulin 220 will more or less fold upon itself due to its flexibility in an accordion-like fashion. Such progressive movement of the rearmost bow 230 will successively sweep along therewith and in advance of all the bows associated with the carriers 142, 140, 138, 136 and 134 until the carrier 134 reaches a position closely adjacent to but spaced from the forward end of the guide 36. Such final position approximates that shown of the structure shown in FIGURE 2. Actually, the carriers will be somewhat closer spaced to each other than shown in FIGURE 2 in such final position of retraction of the roof structure 14, the FIGURE 2 showing of the carriers departing therefrom to make the separate identities of the individual carriers more apparent. It is especially important to note that the previously described alternate configurations of the carriers enable the carriers to occupy a very minor portion of the axial extent of the guides 36 and 38 when the roof structure 14 is collapsed or retracted inasmuch as the maximum longitudinal extents of the carriers are alternately disposed above and below the vertical extents of the guides, whereupon the carriers can be longitudinally nested, so to speak, with respect to each other. This will be evident when it is considered that from the side such carriers have an overall extent compatible with triangular configurations with alternate triangular configurations having their apices and bases interchanged. The nesting capability of the carriers enables a greater degree of retraction of the roof structure 14 than would otherwise be the case as would be evident if all the carriers were of only one of the two described types.

When it is desired to extend the roof structure 14 to that shown thereof in FIGURE 1 from that approximately shown in FIGURE 2, the shafts 82 and 85 are caused to rotate in unison in an anticlockwise direction as viewed in FIGURE 6, whereupon the bow 230 is forced rearwardly until it reaches the position shown thereof in FIGURE 1, it being evident that the tensioning of the tarpaulin between successive bows during rearward movement of the bow 230 will successively urge the carriers 142, 140, 138, 136 and 134 to successively move rearwardly along therewith. Inasmuch as such extension of the roof structure 14 involves or requires the transference of force longitudinally along the extent of the tarpaulin 220, it will be understood that the latter may be made sufficiently strong in its longitudinal dimensions so as to withstand the tensile stresses to which the same is subjected. Reinforcing can conveniently be by way of securing elongated flexible strips along the length of the tarpaulin 220, not shown, or by reinforcing the same with flexible links of wire, not shown, appropriately secured at spaced positions along their lengths to the tarpaulin 220. It may be noted that the whole design of the carriers, guides and chain housing is to have the bows travel the guides with the least amount of drag on the tarpaulin as it is extended from its collapsed position, otherwise if the carriers and bow assembly did not roll free, there would be a strain on the tarpaulin where it is fastened to the bows causing it to tear, so extreme care has been taken to have a free running bow and carrier assembly. The intermediate bows are merely to hold up the tarpaulin at evenly spaced intervals, whereas the rear bow assembly holds up the tarpaulin and also stretches it out over the truck bed.

It will be evident that when the relative angular positions of the shafts 82 and 85 are fixed as by connection by the connecting shaft 116, the means by which the rearmost carriers can be detachably secured at selected positions along the lowermost flights of the chains affords the obvious advantage of the carrier 144 and its counterpart on the guide 38 being positionable at precisely transversely aligned positions while also being coupled to the chains.

Inasmuch as the tarpaulin 220 in its extended condition does not make a substantially airtight connection with the upper edges of the side walls 28 and 30 of the truck 10, there being a minor degree of spacing therebetween, it will be evident that some degree of air flow can occur through such space, and that during rapid forward movement of the truck 10 such air flow can become substantial due to the partial vacuum existing at the rear end of the truck. Inasmuch as the intermediate transverse extent of the tarpaulin 220 at its rearmost edge is disposed at a height above the upper edge of the conventional tail gate 32, the air flow can be of such a magnitude as to produce a very bad result when the cargo is of such semifluid character as wheat. Excessive air flow through the space intervening between the tarpaulin 220 and the top edge of the endgate 32 can in the case of a cargo such as wheat result in substantial quantities of wheat being carried from the truck and irretrievably lost.

Accordingly, the present invention is provided with means whereby air flow such as could otherwise occur between the upper edge of the endgate 32 and the rear edge of the tarpaulin 220 can be greatly reduced.

Figure 8:
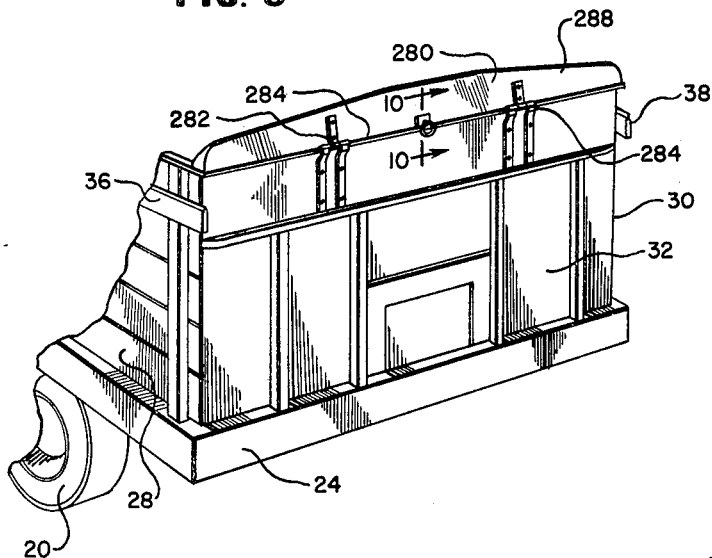
FIGURE 8 is a fragmentary isometric view of the rear end of the truck shown in FIGURES 1 and 2, this view illustrating the rear ends of the guides and a closure member mounted on the upper edge of the tail gate, the tail gate and the closure member being shown in closing positions.
Figure 9:
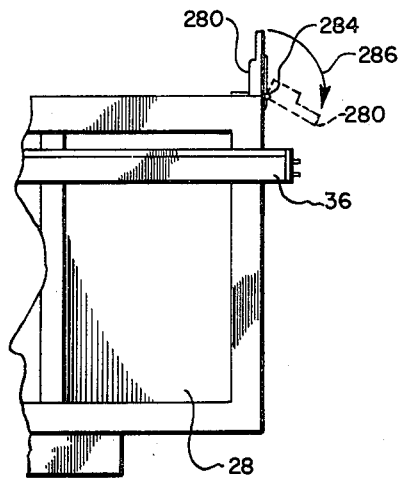
FIGURE 9 is a fragmentary side elevational view of the rear end of the truck, and illustrates in dashed outline the closure member swung from its closing position shown in full lines; and, FIGURE 10 is an enlarged vertical sectional detail view taken upon the plane of the section 10—10 in FIGURE 8.

The means provided for limiting or reducing the freedom of air flow between the upper edge of the tailgate 32 and the rear end of the tarpaulin 220 when the latter is in its fully extended position comprises a closure member or wall 280 hingedly connected to the upper edge of the tail gate 32 at 282 and 284, it being noted that the hinge axis is disposed at the rear edge of the juncture 284 of the endgate 32 and the closure wall 280 when the endgate 32 and the closure wall 280 are in their closing positions shown in FIGURE 8, the arrangement being such that anticlockwise swinging movement of the closure wall 280, as viewed in FIGURE 9, is limited to that shown thereof in full lines in FIGURE 9 by abutment of the adjacent upper and lower edges, respectively, of the endgate 32 and the closure wall 280 in the position shown in full lines in FIGURE 9. The closure wall 280 can be swung in a clockwise direction as indicated by the arrow 286 in FIGURE 9 to open the space intervening between the endgate and the extended tarpaulin 220. It will be noted that when the closure wall 280 is in its closing position, both the endgate 32 and the closure wall 280 are vertical and substantially coplanar with each other. If desired, the closure wall 280 can in its closing position be inclined slightly upwardly and forwardly so that the upper edge thereof is disposed under the rear edge of the tarpaulin. With such inclination, the rearward extent of the tarpaulin need not be quite so great.

As plainly apparent in FIGURE 9, the guides 36 and 38 extend somewhat rearwardly of the tail gate 32, whereby the bow 230 is disposed substantially directly above the endgate 32 and the closure wall 280 when the tarpaulin 220 is in its fully extended position. The transverse extent of the closure wall 280 is substantially that of the spacing of the side walls 28 and 30, and the closure wall 280 has an upper edge configuration or periphery 288 that substantially complements the underside contour of the bow 230. Not only is the periphery 288 substantially complementary to the bow 230, but the vertical extent of the closure wall 280 is such that when the closure wall 280 is closed its upper edge is closely spaced to the bow 230 and the tarpaulin 220 carried thereby.

Figure 10:
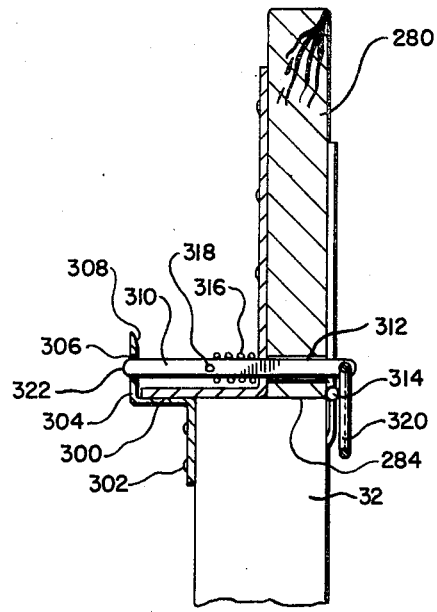

Means is provided for releasably latching the closure wall 280 in closing position relative to the endgate 32. Such means comprises a latchkeeper fixed to the upper inner edge of the endgate 32 as indicated at 302. The latchkeeper includes an upstanding offset portion 304 having an aperture 306 therethrough, and the upper end of the offset portion 304 is inclined to define a camming surface 308. As will be apparent on inspection of FIGURE 10, the upstanding portion 304 extends above the juncture 284 of the endgate 32 and the closure wall 280. A latch bolt 310 slidably extends through an opening 312 through the closure wall 280, the opening 312 being in alignment with the aperture 306 when the closure wall 280 is in its closing position as shown in FIGURES 8 and 10. The relationship is such that the latch bolt 310 can extend horizontally through the aperture 306 so as to prevent swinging movement of the closure wall 280 about the pivotal axis 314 defined by the hinges 282 and 284. Compression spring means 316 embraces the latch bolt 310 intermediate the forward side of the closure wall 280 and a radially extending pin 318 on the latch bolt 310. As will be appreciated on inspection of the drawings, the spring 316 yieldingly urges the latch bolt 310 into a position such as to be received through the aperture 306. The end of the latch bolt 310 on the rear side of the closure wall 280 is provided with a pull ring 320 by means of which the latch bolt 310 can be pulled from engagement with the latchkeeper 300 against the bias of the spring means 316, whereby the closure wall 280 can be released and swung into an opening position as indicated by the arrow 286 in FIGURE 9. The pull ring 320 limits the extent of movement of the latch bolt 310 in the direction urged by the spring means 316, and such extent of the movement of the latch bolt 310 is such that the end 322 of the latch bolt 310 will engage the camming surface 308 so as to permit the closure wall 280 to be moved into its closing position with the latch bolt 310 then passing into locking position in the aperture 306.

Attention is now directed to means whereby the chain sprocket shafts 82 and 85 are reversely and forwardly driven into unison by a truck operator situated in the operator's cab 12. Such means are electrical and include a reversible direct current motor 330 mounted in any suitable manner upon the front side of the truck bed front wall 26 at a position below the connecting shaft 116. Preferably, the reversible direct current motor 330 is mounted upon a fixed portion of the front wall 26 (that is, below any detachable upper portion of the front wall 26), and a reduction gear box 332 is also mounted upon such fixed portion of the front wall 26, the output shaft 334 of the motor 330 being connected to the input of the gear box 332, and the output shaft 336 of the gear box 32 is provided with a fixed chain sprocket 38. An endless chain indicated schematically at 340 in FIGURE 6 is entrained over the chain sprocket 338 and a chain sprocket 342 fixed to the shaft 82 at a position intermediate the connecting shaft 116 and the guide 36. If desired, though not shown, a housing can be detachably secured to the front wall 26 to protect the motor 330, the gear box 332, the sprockets 338 and 342 and the chain 340 from the elements, and especially to safeguard persons from accidentally coming into contact therewith.

As thus far described, it will be evident that the motor 330 can be selectively driven in rotation in either direction with the speed of rotation being substantially reduced by the gear box 332 (which can be a double worm gear type) and such reduced rate of rotation imparted with still further reduction (by virtue of the relatively larger size of the sprocket 342) to the shafts 82 and 85. As previously explained, the detachable coupling of the shafts 82 and 85 is such as to assure their rotating in unison.

Attention is now directed to the electrical circuitry associated with energizing the electric motor 330 selectively to rotate in a forward or a reverse direction, or to stop entirely. It may be interjected at this point that when the motor 330 is deenergized, the reduction gearing 332 coupled with the usual amount of friction in such apparatus and in the motor 330 serves to lock the shafts 82 and 85 against rotation, at least against such forces as may be imposed thereon by wind action, and so forth, on the tarpaulin 220. The electrical circuitry is shown in FIGURE 7, wherein the reference numeral 350 designates an electrical battery, such battery 350 preferably being the storage battery conventionally included as an integral part of the ignition, lights, etc., system of the truck 10 and disposed in the engine compartment 16 thereof. One terminal of the battery 350 is grounded to the frame of the truck 10 as indicated at 352. A pair of electrical relays 354 and 356 are provided, such relays being identical and respectively including solenoids 358 and 360 and normally open solenoid actuated switches 362 and 364. The relays 354 and 356 are enclosed in a housing 366, and such relay housing 366 is, like the motor 330 and the gear box 332, mounted on the front wall 26 of the truck 10. One terminal each of the solenoids 358 and 360 is grounded, as by leads 368 and 370 so as to be in electrical engagement with the grounded terminal 352 of the battery 350.

The solenoids 358 and 360 are normally not energized and their respective switches 362 and 364 are therefore normally open; however, means is provided for selectively energizing the solenoids 358 and 360 from the ungrounded terminal of the battery 350, such means comprising a conductor 374 connected between the ungrounded terminal of the battery 350 and the movable contact 376 of a normally open single pole, double throw switch 378, the switch 378 being conventional and of the type spring biased to its open position. The conductor 374 is fused at 380. Inasmuch as the solenoids 358 and 360 draw very little current the conductor 374 can be relatively fine wire, and the fuse 380 a fuse of correspondingly low value. One of the fixed contacts 380 is connected by a conductor 382 to a normally closed microswitch 384, such microswitch 384 being in turn connected by a conductor 386 to the ungrounded terminal of the solenoid 358. Similarly, the other fixed contact 388 of the switch 378 is connected by a conductor 390 to a normally closed microswitch 392, such microswitch 392 being in turn connected by a conductor 394 to the ungrounded terminal of the solenoid 360. As in the case of the conductor 374, the conductor 382, 386, 390 and 394 can be of light wire of relatively low current carrying capacity.

As thus far described, the movable contact 376 of the switch 378 can be pressed from its normal position into contact with the contact 380, whereupon (provided the microswitch 384 is closed) the solenoid 358 is energized and the switch 362 actuated from its normally open position to its closed position. In a similar manner the contact 376 can be pressed into engagement with the contact 388, whereupon the solenoid 360 can be energized to close the normally open switch 364. It will be understood that the switch 378 is disposed within the operator's cab 12 in a position conveniently accessible to the operator of the truck 10.

The reversible direct current motor 330 which can conveniently be of the type conventionally employed in connection with electrically actuated means for raising and lowering the tops of convertible type automobiles includes three terminals, one of which is grounded as indicated at 396, and a pair of terminals 398 and 400. As will be well understood by those familiar with reversible direct current motors of the type described, the maintenance of a direct current electric potential between the terminal 400 and the ground 396 will cause the motor 330 to run in one direction, while application of such a potential between the terminal 398 and the grounded terminal will cause rotation of the motor 330 in the opposite direction. The relay switches 362 and 364 selectively control the application of a direct current electric potential to the motor terminals 398 and 400. The motor terminals 398 and 400 are connected respectively by conductors 402 and 404 to the stationary contacts of the switches 364 and 362, respectively, and the movable contacts of the switches are connected together by a common conductor 406 to the ungrounded terminal of the battery 350. The conductor 406 is provided with a fuse 408. Inasmuch as the electric motor 330 will draw a substantial amount of current, the relay switches 362 and 364 are preferably of heavy duty type, and the conductors 402, 404 and 406 are relatively heavy conductors appropriate to the current carried by the same. Similarly, the fuse 408 will have a higher amperage rating than the fuse 380. While the electric motor 330 can be of the same power rating as those employed in connection with the raising and lowering mechanism of the tops of convertible type automobiles, it is preferred that the motor 330 have a somewhat higher power rating so as to be more positive in action, or so as to enable relatively greater speeds of extension and retraction of the roof structure 14 of the truck 10.

As thus far described, the electric motor 330 is normally deenergized and the roof structure 14 will remain in whatever position it happens to be disposed. At the option of the operator of the truck 10, he may manually and selectively actuate the movable contact 376 of the switch 378 into electrical engagement with either of the stationary contacts 380 and 388. Thus, assuming that engagement of the contacts 376 and 380 with each other causes rotation of the motor 330 in such a direction as to drive the sprocket 80 in a clockwise direction as viewed in FIGURE 6, the operator of the truck 10 can by such operation of the switch 378 cause retraction of the roof structure 14 from the position shown thereof in FIGURE 1. Should the operator decide that he desires the roof structure 14 to occupy a position intermediate its fully extended and retracted positions, the operator simply disengages the contacts 376 and 380 when the roof structure 14 reaches its desired position. If the operator desires that the roof structure 14 be driven to its fully retracted position, he simply maintains the movable contact pressed into engagement with the fixed contact 380 until the roof structure 14 is fully retraced. In order to avoid burnout of the motor 330 or blowing of the fuse 408 when the roof structure 14 reaches its fully retracted position, means is provided for deenergizing the motor 330 against further retracting effort, and such means comprises the previously mentioned microswitch 384 and a switch actuating finger 410 fixed to or mounted on the carriage 142 to project toward the side wall 28. The microswitch 384 is mounted on the side wall 28 of tthe truck in the travel path of the finger 410 and is disposed longitudinally along the side wall 28 to be at a position such as to be engaged by and caused to open by the finger 410 when the forward movement of the carrier 134 has been such as to have reached the position occupied thereby when the roof structure 14 is fully retracted. It will also be noted that it is not essential that a finger 410 be on the carrier 142, but the finger 410 can be disposed on the carrier 144, in which event the longitudinal position of mounting of the microswitches 384 and 392 on the side wall 28 will be appropriate to the positions occupied by the carrier 144 when the latter is in its position corresponding to full retraction and full extension of the roof structure 14.

In view of the interaction between the actuating finger 410 and the microswitch 384, the switch 384 will be open when the roof structure 14 is forwardly driven to its fully retracted position, and thus deenergizes the motor 330 even though the operator maintains the contact 376 in contact with the contact 380.

Inasmuch as the carrier 142 occupies a particular position when the roof structure 14 is fully extended, the microswitch 392 is mounted on the side wall 28 at a position rearwardly of the microswitch 384 and such that the same will be actuated into its open position by the finger 410 when the carriage 142 reaches the position occupied thereby when the roof structure is fully extended. It will be understood that when the roof structure 14 is in its fully retracted position such that the microswitch 384 is open, the fact that the microswitch 384 is open does not interfere with energization of the motor 330 in the direction resulting from engagement of the movable contact 376 with the stationary contact 388 of the switch 378, and consequently, such contacts can be closed and the roof structure 14 actuated to move towards its extended position. As soon as such extension movement is sufficient to disengage the finger 410 from the microswitch 384 has occurred, the operator can stop further extension of the roof structure and close the contacts 376 and 380 if he so desires so as to cause retraction movement of the roof structure 14. However, if the operator simply continues extension of the roof structure 14 by maintaining the contacts 376 and 388 closed, the roof structure 14 will move to its fully extended position on the occurrence of which the finger 410 actuates opening of the microswitch 392 and consequent deenergization of the motor 330. Thus, the electrical control means is disabled or rendered inoperative insofar as energizing the motor to rotate in a direction corresponding to movement of the roof structure in such direction when the latter has reached the limit of its freedom of movement.

As mentioned previously, the microswitch actuating finger 410 need not be on the carrier 134 but can be disposed on the carrier 144. While the illustrated and described embodiment of the invention employs a single microswitch actuator finger 410 for actuating both the microswitches 384 and 392, it will be evident that separate actuator fingers on separate carriers could be provided if desired, one finger and its associated microswitch being disposed at a greater height than the other finger and its associated microswitch.

In the normal use of the apparatus the forward end of the truck bed remains covered. This does not preclude filling the forward end of the truck to a substantial extent with wheat or the like considering the flowing character of the wheat. However, to obtain complete filling of the front end of the truck (especially those having a long bed so as to necessitate a greater number of bows), the operator can follow a simple procedure to accomplish this objective. The operator retracts the roof structure, and by means of short lengths of rope or chain, not shown, secures at each side of the truck the forwardmost and rearmost carriages. He then detaches the front end of the tarpaulin from the front wall of the truck bed and folds the freed portion of the tarpaulin forward of the front bow back over the top of the rest of the tarpaulin. Then with the front and rear carriages (and bows) secured against relative separation movement, the operator drives the apparatus to move the rear bow rearwardly whereupon the entire roof structure in a collapsed condition moves rearwardly as a unit and uncovers the front end of the truck bed. After loading the front end of the truck the foregoing steps are performed in reverse to restore the apparatus to its original condition.

If desired, an additional partition can be disposed within each of the hollow guides above the partition 70. Such partition can be at such a height that the upper chain flight will be supported thereon with very little sag. This provision will tend to reduce any tendency for the chain to slap on variations in the tension thereof in the use of the same.

Whereas electrical means are disclosed to drive the chains, it will be evident to those skilled in the art that hydraulic and pneumatic equivalents may be substituted for such electrical means, it being noted that many present day trucks are equipped with hydraulic and pneumatic power sources.

I claim:

1. In apparatus for the guided support and movement of a retractable and extensible flexible roof structure of the type including a pair of parallel elongated support guides adapted to be mounted horizontally on the opposite sides of the roof-coverable area, and a plurality of roof bow support means guidingly supported on each of the guides, the improvement comprising each of said guides being hollow and having an endless drive chain extending therein within the hollow thereof, sprockets carried by the guide adjacent the opposite ends thereof with said endless chain being entrained over said sprockets, each of said bow support means including a supported and guided member disposed externally of the hollow guide, vertically spaced laterally projecting stub axles on said member, an upper roller rotatably mounted on the uppermost of said stub axles, said upper roller being disposed on top of the guide and in peripheral rolling engagement thereon, with the top of the guide and the circumferential periphery of the upper roller having meshing rib and groove means for preventing axial movement of the upper roller relative to the guide, a lower roller rotatably mounted on the lowermost of the stub axles, said lower roller being disposed on the bottom of the guide and in close peripheral rolling proximity thereto, with the bottom of the guide and the circumferential periphery of the lower roller having meshing rib and groove means for preventing axial movement of the lower roller relative to the guide, said guide having a longitudinally extending slot in the bottom thereof opening into said hollow, and at least one of said support means being provided with an upright member having an operative connection with the chain through said slot.

2. The combination of claim 1, wherein said rib and groove means preventing axial movement of the lower roller is defined by the slot and by the lower roller having a peripheral rib received in said slot.

3. The combination of claim 1, wherein said rib and groove means for preventing axial movement of the upper roller comprises the guide having an upstanding longitudinally extending rib on the top thereof directly overlying the endless chain, and by said upper roller having a peripheral groove receiving said rib.

4. The combination of claim 2, wherein said rib and groove means for preventing axial movement of the upper roller comprises the guide having an upstanding longitudinally extending rib on the top thereof directly overlying said slot, and by said upper roller having a peripheral groove receiving said rib.

5. The combination of claim 1, including a longitudinally extending partition in the hollow of said guide dividing the interior thereof into upper and lower portions, said endless chain having upper and lower flights between said sprockets disposed respectively above and below the partition.

6. The combination of claim 5, said slot together with a peripheral rib on the lower roller constituting the rib and groove means for preventing axial movement of the lower roller relative to the guide, and said operative connection of the upright member to said chain comprising the member including an offset upstanding portion projecting upwardly through said slot and into operative engagement with the lower flight of the chain.

7. The combination of claim 6, wherein the offset upstanding portion of the member is vertically movable relative to the latter, means for releasably securing such offset portion against movement relative to the member, and said offset member having a bifurcated upper end projecting upwardly into meshing engagement with the chain, whereby the member can be operatively connected to the chain at a selected position along the length of the endless chain.

8. The combination of claim 1, wherein the member of solely alternate support means is provided with a second upper stub axle and roller corresponding in its relationship to the guide to the first mentioned upper stub shaft and upper roller, said upper rollers being spaced longitudinally relative to the longitudinal extent of the guide and in such longitudinal sense being disposed on opposite sides of the longitudinal position of the lower roller, whereby tilting of the member about a horizontal axis transverse to the longitudinal extent of the guide is prevented.

9. The combination of claim 1, wherein the member of solely alternate support means is provided with a second lower stub axle and roller corresponding in its relationship to the guide to the first mentioned lower stub shaft and lower roller, said lower rollers being spaced longitudinally relative to the longitudinal extent of the guide and in such longitudinal sense being disposed on opposite sides of the longitudinal position of the upper roller, whereby tilting of the member about a horizontal axis transverse to the longitudinal extent of the guide is prevented.

10. The combination of claim 1, wherein a plurality of bow support means are provided that are disposed in a sequence longitudinally along each of said guides with adjacent bow support means being relatively movable with respect to each other in the direction of the longitudinal extent of the guide, first and second adjacent bow support means respectively having greater and lesser longitudinal extents at the upper stub axle, said first and second bow support means respectively having lesser and greater longitudinal extents at the lower stub axle, such first and second bow support means being so constructed and arranged that they can be moved into such close proximity that the first of such means can partially overlie the second of such means, said first bow support having a second upper stub axle and roller with the lower roller of such first bow support means being disposed longitudinally intermediate the upper rollers thereof, said second bow support means having a second lower stub axle and roller with the upper roller of such second bow support means being longitudinally intermediate the lower rollers thereof, whereby the sequence of the plurality bow support means can be nested.

11. Apparatus for supporting, guiding and moving a carrier comprising an elongated and horizontally extending hollow guide, said guide having a longitudinally extending slot opening into the interior thereof, a carrier disposed at a side of the guide and provided with vertically spaced upper and lower rollers respectively disposed above and below the guide to engage the top and bottom of the guide, a pair of chain sprockets mounted adjacent opposite ends of the guide, an endless chain disposed within the guide and entrained over the sprockets, and means extending through the slot and operatively connecting the carrier and the chain.

12. Apparatus for supporting, guiding and moving a carrier comprising an elongated and horizontally extending hollow guide, said guide having a longitudinally extending slot opening into the interior thereof, a carrier disposed at a side of the guide and provided with vertically spaced upper and lower rollers respectively disposed above and below the guide to engage the top and bottom of the guide, a pair of chain sprockets mounted adjacent opposite ends of the guide, an endless chain disposed within the guide and entrained over the sprockets to define chain flights between the sprockets, said guide having an internal partition disposed between and separating the chain flights, and means extending through the slot and operatively connecting the carrier and one of the chain flights, said slot being in the bottom of the guide, and said lower roller having a peripheral rib received in said slot.

13. The combination of claim 12, including a partition in the guide separating the hollow interior thereof into upper and lower portions, and said endless chain having upper and lower flights disposed respectively in the upper and lower portions of the hollow interior.

14. In the combination of a self-propelled cargo vehicle of the type including a truck bed having an upstanding front end wall, spaced upstanding side walls, and a rectangular endgate pivotally mounted along an edge to the rear edge of the truck bed with a retractable and extensible roof of flexible material having a front edge secured to the front end wall and supported by a series of relatively movable bows supported and guided for forward and rearward movement upon guides carried by the side walls; the improvement wherein each of the bows is generally of an inverted U-shaped configuration including depending leg portions connected by a web portion, and wherein the bows are supported and guided by a pair of longitudinally hollow guides carried by and extending along the side walls, each leg portion of each bow being provided with a carrier movably mounted on one of said hollow guides, said hollow guide having a longitudinally extending slot in the bottom thereof opening into the hollow interior of the guide, said hollow guide having a longitudinally extending rib along the top thereof, said carrier having an upper roller on the top of the guide, such upper roller having a peripheral groove receiving the rib therein, said carrier having a lower roller on the bottom of the guide, such lower roller having a peripheral rib received in the slot, driving and driven chain sprockets mounted on the guide adjacent the opposite ends of the guide, and an endless chain within the hollow guide and entrained over the sprockets, means operatively connecting the carriers of the leg portions of the rearmost bow to the chains within the guides, the last recited means extending through the slots of the guides, and means for reversibly driving the driving sprockets in unison.

15. The combination of claim 14, wherein the means for reversibly driving the driving sprockets in unison includes said driving sprockets being mounted on a common drive shaft, and said drive shaft being comprised of two separate sections, and means for detachably securing the shaft sections together.

16. The combination of claim 14, wherein said means for reversibly driving the sprockets includes electrical control means comprising forward and reverse circuits, and means responsive to the rearmost bow being disposed at relative forward and reverse positions to disable respectively the forward and reverse circuits.

17. The combination of claim 14, wherein each bow is provided with means enabling variation in the spacing of the leg portions thereof, whereby excessive stresses in the bows are avoided on variation in the spacing of the guides such as may occur on cargo-caused outward bulging of the side walls.

18. The combination of claim 17, wherein said means enabling variation in the spacing of the leg portions of a bow comprises the web portion being defined by such web portion including telescopingly connected parts.

References Cited

UNITED STATES PATENTS

| | | | |
|---|---|---|---|
| 1,602,017 | 10/1926 | Hamilton | 296—105 |
| 2,084,733 | 6/1937 | Kahliff | 49—199 |
| 3,326,598 | 6/1967 | Kunsch | 296—105 |

LEO FRIAGLIA, Primary Examiner

J. E. SIEGEL, Assistant Examiner

U.S. Cl. X.R.

160—188